United States Patent
Li et al.

(10) Patent No.: US 11,388,034 B2
(45) Date of Patent: Jul. 12, 2022

(54) METHOD AND APPARATUS USING CELL-SPECIFIC AND COMMON PILOT SUBCARRIERS IN MULTI-CARRIER, MULTI-CELL WIRELESS COMMUNICATION NETWORKS

(71) Applicant: Neo Wireless LLC, Wayne, PA (US)

(72) Inventors: Xiaodong Li, Kirkland, WA (US); Titus Lo, Bellevue, WA (US); Kemin Li, Bellevue, WA (US); Haiming Huang, Bellevue, WA (US)

(73) Assignee: NEO WIRELESS LLC, Wayne, PA (US)

( * ) Notice: Subject to any disclaimer, the term of this patent is extended or adjusted under 35 U.S.C. 154(b) by 0 days.

(21) Appl. No.: 17/201,703

(22) Filed: Mar. 15, 2021

(65) Prior Publication Data
US 2021/0203535 A1 Jul. 1, 2021

Related U.S. Application Data

(63) Continuation of application No. 17/012,813, filed on Sep. 4, 2020, now Pat. No. 10,965,512, which is a
(Continued)

(51) Int. Cl.
*H04W 4/00* (2018.01)
*H04L 27/26* (2006.01)
(Continued)

(52) U.S. Cl.
CPC ......... *H04L 27/2637* (2013.01); *H04B 1/707* (2013.01); *H04B 7/0413* (2013.01);
(Continued)

(58) Field of Classification Search
CPC .............. H04W 52/367; H04W 52/34; H04W 52/04; H04W 52/143; H04W 52/325
See application file for complete search history.

(56) References Cited

U.S. PATENT DOCUMENTS

| | | | |
|---|---|---|---|
| 5,825,807 | A | 10/1998 | Kumar |
| 5,828,650 | A | 10/1998 | Malkamaki et al. |
| 5,867,478 | A | 2/1999 | Baum et al. |
| 5,898,338 | A | 4/1999 | Proctor et al. |
| 5,909,436 | A | 6/1999 | Engstrom et al. |

(Continued)

FOREIGN PATENT DOCUMENTS

| | | |
|---|---|---|
| CN | 1407745 | 4/2003 |
| CN | 1445949 | 10/2003 |

(Continued)

OTHER PUBLICATIONS

European Telecommunications Standards Institute, Digital Video Broadcasting (DVB); Framing structure, channel coding and modulation for digital terrestrial television, ETSI EN 300 744 V1.5.1 (Jun. 2004).

(Continued)

*Primary Examiner* — Omoniyi Obayanju
(74) *Attorney, Agent, or Firm* — Volpe Koenig

(57) ABSTRACT

A multi-carrier cellular wireless network (400) employs base stations (404) that transmit two different groups of pilot subcarriers: (1) cell-specific pilot subcarriers, which are used by a receiver to extract information unique to each individual cell (402), and (2) common pilots subcarriers, which are designed to possess a set of characteristics common to all the base stations (404) of the system. The design criteria and transmission formats of the cell-specific and common pilot subcarriers are specified to enable a receiver to perform different system functions. The methods and processes can be extended to other systems, such as those with multiple antennas in an individual sector and those where some subcarriers bear common network/system information.

22 Claims, 13 Drawing Sheets

Common subcarrier arrangement for Cell *p*

Common subcarrier arrangement for Cell *q*

Related U.S. Application Data continuation of application No. 16/440,754, filed on Jun. 13, 2019, now abandoned, which is a continuation of application No. 15/688,441, filed on Aug. 28, 2017, now Pat. No. 10,326,631, which is a continuation of application No. 14/746,676, filed on Jun. 22, 2015, now Pat. No. 9,749,168, which is a continuation of application No. 14/595,132, filed on Jan. 12, 2015, now Pat. No. 9,065,614, which is a continuation of application No. 13/874,278, filed on Apr. 30, 2013, now Pat. No. 8,934,473, which is a continuation of application No. 13/212,116, filed on Aug. 17, 2011, now Pat. No. 8,432,891, which is a continuation of application No. 10/583,530, filed as application No. PCT/US2005/001939 on Jan. 20, 2005, now Pat. No. 8,009,660.

(60) Provisional application No. 60/540,032, filed on Jan. 29, 2004.

(51) Int. Cl.
*H04W 16/02* (2009.01)
*H04B 1/707* (2011.01)
*H04L 5/00* (2006.01)
*H04L 25/03* (2006.01)
*H04L 27/00* (2006.01)
*H04W 72/04* (2009.01)
*H04B 7/0413* (2017.01)
*H04J 11/00* (2006.01)
*H04L 25/02* (2006.01)

(52) U.S. Cl.
CPC .......... *H04J 11/005* (2013.01); *H04L 5/0007* (2013.01); *H04L 5/0028* (2013.01); *H04L 5/0048* (2013.01); *H04L 25/03834* (2013.01); *H04L 27/0008* (2013.01); *H04L 27/0012* (2013.01); *H04L 27/2602* (2013.01); *H04L 27/2613* (2013.01); *H04L 27/2626* (2013.01); *H04L 27/2646* (2013.01); *H04W 16/02* (2013.01); *H04W 72/044* (2013.01); *H04W 72/0446* (2013.01); *H04L 5/0016* (2013.01); *H04L 25/0228* (2013.01); *H04L 27/2607* (2013.01); *H04L 27/2655* (2013.01); *H04L 27/2657* (2013.01)

(56) References Cited

U.S. PATENT DOCUMENTS

| | | |
|---|---|---|
| 5,929,704 A | 7/1999 | Proctor et al. |
| 6,078,216 A | 6/2000 | Proctor |
| 6,101,179 A | 8/2000 | Soliman |
| 6,141,546 A | 10/2000 | Thomas |
| 6,175,550 B1 | 1/2001 | van Nee |
| 6,188,717 B1 | 2/2001 | Kaiser |
| 6,434,364 B1 | 8/2002 | O'Riordain |
| 6,480,558 B1 | 11/2002 | Ottosson et al. |
| 6,515,960 B1 | 2/2003 | Usui et al. |
| 6,567,383 B1 | 5/2003 | Bohnke |
| 6,600,772 B1 | 7/2003 | Zeira et al. |
| 6,643,281 B1 | 11/2003 | Ryan |
| 6,731,673 B1 | 5/2004 | Kotov et al. |
| 6,741,578 B1 | 5/2004 | Moon et al. |
| 6,771,706 B2 | 8/2004 | Ling et al. |
| 6,839,876 B1 | 1/2005 | Tong et al. |
| 6,847,678 B2 | 1/2005 | Berezdivin et al. |
| 6,882,619 B1 | 4/2005 | Gerakoulis |
| 6,922,388 B1 | 7/2005 | Laroia et al. |
| 6,940,827 B2 | 9/2005 | Li et al. |
| 7,035,663 B1 | 4/2006 | Linebarger et al. |
| 7,039,001 B2 | 5/2006 | Krishnan et al. |
| 7,062,002 B1 | 6/2006 | Michel et al. |
| 7,123,934 B1 | 10/2006 | Linebarger et al. |
| 7,133,352 B1 | 11/2006 | Hadad |
| 7,149,239 B2 | 12/2006 | Hudson |
| 7,161,985 B2 | 1/2007 | Dostert et al. |
| 7,161,987 B2 | 1/2007 | Webster et al. |
| 7,218,666 B2 | 5/2007 | Baum et al. |
| 7,260,054 B2 | 8/2007 | Olszewski |
| 7,263,058 B2 | 8/2007 | Joo |
| 7,274,652 B1 | 9/2007 | Webster et al. |
| 7,317,931 B2 | 1/2008 | Guo |
| 7,324,434 B2 | 1/2008 | Sawahashi et al. |
| 7,342,974 B2 | 3/2008 | Chiou |
| 7,386,055 B2 | 6/2008 | Morita et al. |
| 7,403,556 B2 | 7/2008 | Kao et al. |
| 7,411,897 B2 | 8/2008 | Yoo et al. |
| 7,418,042 B2 | 8/2008 | Choi et al. |
| 7,420,915 B2 | 9/2008 | Murakami et al. |
| 7,443,829 B2 | 10/2008 | Rizvi et al. |
| 7,471,667 B2 | 12/2008 | Hirsch et al. |
| 7,548,506 B2 | 6/2009 | Ma et al. |
| 7,555,268 B2 | 6/2009 | Trachewsky et al. |
| 7,567,624 B1 | 7/2009 | Schmidl et al. |
| 7,639,660 B2 | 12/2009 | Kim |
| 7,646,747 B2 | 1/2010 | Atarashi et al. |
| 7,650,152 B2 | 1/2010 | Li et al. |
| 7,693,032 B2 | 4/2010 | Li et al. |
| 7,724,720 B2 | 5/2010 | Korpela et al. |
| 7,738,437 B2 | 6/2010 | Ma |
| 7,864,725 B2 | 1/2011 | Li et al. |
| 7,873,009 B2 | 1/2011 | Larsson et al. |
| 7,876,716 B2 | 1/2011 | Sudo |
| 7,907,592 B2 | 3/2011 | Han et al. |
| 8,009,660 B2 | 8/2011 | Li et al. |
| 8,089,887 B2 | 1/2012 | Lippman et al. |
| 8,094,611 B2 | 1/2012 | Li et al. |
| 8,102,832 B2 | 1/2012 | Agrawal et al. |
| 8,199,632 B2 | 6/2012 | Geile et al. |
| 8,363,691 B2 | 1/2013 | Hasegawa et al. |
| 8,428,009 B2 | 4/2013 | Li et al. |
| 8,432,891 B2 | 4/2013 | Li et al. |
| 8,467,366 B2 | 6/2013 | Li et al. |
| 8,767,522 B2 | 7/2014 | Li et al. |
| 10,638,468 B2 | 4/2020 | Nelson et al. |
| 2001/0021182 A1 | 9/2001 | Wakutsu |
| 2002/0141483 A1 | 10/2002 | Doetsch et al. |
| 2002/0159422 A1 | 10/2002 | Li et al. |
| 2003/0072255 A1 | 4/2003 | Ma et al. |
| 2003/0081538 A1 | 5/2003 | Walton et al. |
| 2003/0179776 A1 | 9/2003 | Sumasu et al. |
| 2004/0001429 A1 | 1/2004 | Ma et al. |
| 2004/0082356 A1* | 4/2004 | Walton ................ H04B 7/0669 455/522 |
| 2004/0085946 A1 | 5/2004 | Morita et al. |
| 2004/0109432 A1* | 6/2004 | Laroia .................. H04W 52/34 370/343 |
| 2004/0114504 A1 | 6/2004 | Jung et al. |
| 2004/0160921 A1* | 8/2004 | Kaipainen ........... H04B 7/0619 370/335 |
| 2004/0171357 A1 | 9/2004 | Lobinger |
| 2004/0190598 A1 | 9/2004 | Seki et al. |
| 2004/0228267 A1* | 11/2004 | Agrawal ............. H04L 25/0232 370/203 |
| 2004/0264600 A1 | 12/2004 | Kao et al. |
| 2005/0111397 A1 | 5/2005 | Attar et al. |
| 2006/0114815 A1 | 6/2006 | Hasegawa |
| 2006/0245409 A1 | 11/2006 | Korpela |
| 2008/0304551 A1 | 12/2008 | Li et al. |
| 2011/0211617 A1 | 9/2011 | Li et al. |
| 2011/0299474 A1 | 12/2011 | Li et al. |
| 2012/0106513 A1 | 5/2012 | Li et al. |
| 2013/0242937 A1 | 9/2013 | Li et al. |

FOREIGN PATENT DOCUMENTS

| | | |
|---|---|---|
| CN | 1452326 | 10/2003 |
| EP | 1 650 891 | 4/2006 |
| JP | 09-233047 | 9/1997 |

(56) References Cited

FOREIGN PATENT DOCUMENTS

| JP | 10-210002 | 8/1998 |
|---|---|---|
| KR | 2001-0083789 | 9/2001 |
| KR | 2003-0060892 | 7/2003 |
| KR | 2009-0040929 | 4/2009 |
| WO | 2000/035121 A1 | 6/2000 |
| WO | 2001/061880 A1 | 8/2001 |
| WO | 2003/058881 | 7/2003 |

OTHER PUBLICATIONS

Examination Report, European Application No. 05711777.2, dated Oct. 29, 2012, 6 pages.
Examination Report, European Application No. 05712825.8, dated Aug. 16, 2012, 6 pages.
IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz, IEEE Std. 802.16a-2003 (Apr. 1, 2003).
International Search Report and Written Opinion for International Application No. PCT/US05/01939, dated Apr. 26, 2005, 7 pages.
International Search Report and Written Opinion; International Patent Application No. PCT/US05/03518; Filed Jan. 27, 2005; Applicant: WalticalSolutions, Inc.; dated May 23, 2005; 8 pages.
Supplementary European Search Report, European Application No. 05711777, dated May 7, 2012, 6 pages.
Supplementary European Search Report, European Application No. 05712825, dated Mar. 26, 2012, 4 pages.
Tufvesson, F., et al. "OFDM Time and Frequency Synchronization by Spread Spectrum Pilot Technique," Communication Theory Mini-Conference, Vancouver, B.C., Canada, Jun. 6-10, 1999, pp. 115-119.
Hayes, "T1P1—Wireless/Mobile Services and Systems Technical Sub-Committee," IMT-2000 Radio Transmission Technology Candidate, T1P1.1/98-081R1 (Jun. 12, 1998).
Baxley et al., "Power Savings Analysis of Peak-to-Average Power Ratio Reduction in OFDM," IEEE Transactions on Consumer Electronics, vol. 50, No. 3 (Aug. 2004).
Definition of "guard band," McGraw Hill Dictionary of Scientific and Technical Terms, 6th edition (2003).
*Dell Inc. et al.*, v. *Neo Wireless LLC*, Declaration of Craig Bishop, Inter Partes Review of U.S. Pat. No. 8,467,366 and U.S. Pat. No. 10,833,908 (Sep. 2, 2021).
*Dell Inc. et al.*, v. *Neo Wireless LLC*, Declaration of Dr. Matthew Valenti, Inter Partes Review of U.S. Pat. No. 10,833,908 (Dec. 6, 2021).
*Dell Inc. et al.*, v. *Neo Wireless LLC*, Petition for Inter Partes Review of U.S. Pat. No. 10,833,908 pursuant to 35 U.S.C. §§ 311-319, 37 C.F.R. § 42 (Dec. 14, 2021).
ETSI Special Mobile Group (SMG) Report of UMTS 30.06 V3.0.0; Universal Mobile Telecommunications System (UMTS); UMTS Terrestrial Radio Acces (UTRA); Concept evaluation (UMTS 30.06 version 3.0.0), TR 101 146 V3.0.0 (Dec. 1997).
Guo et al., "Reducing Peak-to-Average Power Ratio in OFDM Systems by Adaptive Dynamic Range Companding," 2002 World Wireless Congress, San Francisco, CA (2002).
Kofhman et al., "Broadband Wireless Access Solutions Based on OFDM Access in IEEE 802.16," IEEE Communications Magazine, pp. 96-103 (Apr. 2002).
*Neo Wireless LLC* v. *Apple Inc.*, Apple Inc's Answer to Plaintiff's First Amended Complaint, Civil Action No. 6:21-cv-00026-ADA (Jun. 17, 2021).
*Neo Wireless LLC* v. *Apple Inc.*, Plaintiff's First Amended Complaint, Civil Action No. 6:21-cv-0026 (Apr. 28, 2021).
*Neo Wireless LLC* v. *Dell Technologies Inc. et al.*, Declaration of Roger Fulgham in Support of Defendants' Opening Claim Construction, Civil Action No. 6:21-cv-0024 (Oct. 28, 2021).
*Neo Wireless LLC* v. *Dell Technologies Inc. et al.*, Declaration of James Proctor in Support of Defendants' Opening Claim Construction Brief, Civil Action No. 6:21-cv-0024 (Oct. 27, 2021).
*Neo Wireless LLC* v. *Dell Technologies Inc. et al.*, Declaration of William Alberth in Support of Neo Wireless's Responsive Claim Construction Brief, Civil Action No. 6:21-cv-0024 (Nov. 18, 2021).
*Neo Wireless LLC* v. *Dell Technologies Inc. et al.*, Defendant's Answer, Affirmative Defenses, and Counterclaims to Plaintiff's First Amended Complaint, Civil Action No. 6:21-cv-0024 (Jun. 18, 2021).
*Neo Wireless LLC* v. *Dell Technologies Inc. et al.*, Defendants' Opening Claim Construction Brief, Civil Action No. 6:21-cv-0024 (Oct. 28, 2021).
*Neo Wireless LLC* v. *Dell Technologies Inc. et al.*, Defendants' Reply Claim Construction Brief, Civil Action No. 6:21-cv-0024 (Dec. 2, 2021).
*Neo Wireless LLC* v. *Dell Technologies Inc. et al.*, Joint Claim Construction Statement, Civil Action No. 6:21-cv-0024 (Dec. 21, 2021).
*Neo Wireless LLC* v. *Dell Technologies Inc. et al.*, Neo Wireless's Answer to Dell's Counterclaims, Civil Action No. 6:21-cv-0024 (Jul. 9, 2021).
*Neo Wireless LLC* v. *Dell Technologies Inc. et al.*, Plaintiff Neo Wireless LLC's Claim Construction Sur Reply Brief, Civil Action No. 6:21-cv-0024 (Dec. 16, 2021).
*Neo Wireless LLC* v. *Dell Technologies Inc. et al.*, Plaintiff Neo Wireless LLC's Responsive Claim Construction Brief, Civil Action No. 6:21-cv-0024 (Nov. 18, 2021).
*Neo Wireless LLC* v. *Dell Technologies Inc. et al.*, Stipulated Constructions, Civil Action No. 6:21-cv-0024 (Oct. 27, 2021).
*Neo Wireless LLC* v. *Dell Technologies Inc. et al.*, Supplemental Declaration of James Proctor in Support of Defendants' Reply Claim Construction Brief, Civil Action No. 6:21-cv-0024 (Dec. 2, 2021).
*Neo Wireless LLC* v. *Dell Technologies, Inc. et al.*, Plaintiff's First Amended Complaint, Civil Action No. 6:21-cv-0024 (Apr. 28, 2021).
*Neo Wireless LLC* v. *LG Electrincs Inc.*, Defendant LG's Answer to Plaintiff's First Amended Complaint, Civil Action No. 6:21-cv-00025-ADA (Jun. 17, 2021).
*Neo Wireless LLC* v. *LG Electronics, Inc. et al.*, Plaintiff's First Amended Complaint, Civil Action No. 6:21-cv-0025 (Apr. 28, 2021).
Neo Wireless LLC, Claim Chart—Claim 11 of U.S. Pat. No. 10,833,908, submitted with Plaintiff's First Amended Complaint, *Neo Wireless LLC* v. *Dell, Inc. et al.*, Civil Action No. 6:21-cv-0024 (Apr. 28, 2021).
Panta et al., "Use of Peak-to-Average Power Reduction Technique in HIPERLAN2 and its Performance in a Fading Channel." Proc. 6th International Symposium on DSP for Communication Systems, pp. 113-117, (2002).
Prasad, "Chapter 6—The Peak Power Problem," in OFDM for Wireless Communications Systems, Artech House (2004).
Proakis et al., Digital Signal Processing Principles, Algorithms, and Applications, pp. 5-16, Prentice Hall, 3rd edition (1996).
Sklar, Digital Communications, Fundamentals and Applications, 2nd edition, Prentice Hall PTR, pp. 7-9 (2001).
Universal Mobile Telecommunications System (UMTS); UMTS Terrestrial Radio Acces (UTRA); Concept evaluation (UMTS 30.06 version 3.0.0), TR 101 146 V3.0.0 (Dec. 1997).
Van Nee et al., OFDM for Wireless Multimedia Communications, Artech House (2000).
You et al., "A Simple Construction of OFDM-CDMA Signals with Low Peak-to-Average Power Ratio," IEEE Transactions on Broadcasting, vol. 49, No. 4 (Dec. 2003).
*Neo Wireless LLC* v. *Ford Motor Company*, Plaintiff Neo Wireless LLC's Complaint for Patent Infringement, United States District Court for the Western District of Missouri Western Division, Case No. 4:22-cv-00210-GAF (Mar. 29, 2022).
*Neo Wireless LLC* v. *General Motors Company et al.*, Plaintiff Neo Wireless LLC's Complaint for Patent Infringement, United States District Court for the Eastern District of Texas Marshall Division, Case No. 2:22-cv-00094 (Mar. 29, 2022).

(56) References Cited

OTHER PUBLICATIONS

*Neo Wireless LLC* v. *American Honda Motor Co., Inc. et al.*, Plaintiff Neo Wireless LLC's Complaint for Patent Infringement, United States District Court for the Southern District of Ohio Eastern Division at Columbus, Case No. 2:22-cv-01824-EAS-KAJ (Mar. 29, 2022).
*Neo Wireless LLC* v. *Nissan North America Inc. et al.*, Plaintiff Neo Wireless LLC's Complaint for Patent Infringement, United States District Court for the Middle District of Tennessee Nashville Division, Case No. 3:22-cv-00220 (Mar. 29, 2022).
*Neo Wireless LLC* v. *Tesla Inc.*, Plaintiff Neo Wireless LLC's Complaint for Patent Infringement, United States District Court for the Eastern District of Texas Marshall Division, Case No. 2:22-cv-00095 (Mar. 29, 2022).
*Neo Wireless LLC* v. *Toyota Motor North America, Inc. et al.*, Plaintiff Neo Wireless LLC's Complaint for Patent Infringement, United States District Court for the Eastern District of Texas Marshall Division, Case No. 2:22-cv-00093 (Mar. 29, 2022).
*Neo Wireless LLC* v. *Volkswagen Group of America, Inc., et al.*, Plaintiff Neo Wireless LLC's Complaint for Patent Infringement, United States District Court for the Eastern District of Tennessee Chattanooga District, Case No. 1:22-cv-00076 (Mar. 29, 2022).

\* cited by examiner

METHOD AND APPARATUS USING CELL-SPECIFIC AND COMMON PILOT SUBCARRIERS IN MULTI-CARRIER, MULTI-CELL WIRELESS COMMUNICATION NETWORKS

CROSS-REFERENCE TO RELATED APPLICATION(S)

This application is a continuation of U.S. patent application Ser. No. 17/012,813, filed Sep. 4, 2020, which is a continuation of U.S. patent application Ser. No. 16/440,754, filed Jun. 13, 2019, which is a continuation of U.S. patent application Ser. No. 15/688,441, filed Aug. 28, 2017, which issued as U.S. Pat. No. 10,326,631 on Jun. 18, 2019, which is a continuation of U.S. patent application Ser. No. 14/746,676, filed Jun. 22, 2015, which issued as U.S. Pat. No. 9,749,168 on Aug. 29, 2017, which is a continuation of U.S. patent application Ser. No. 14/595,132, filed Jan. 12, 2015, which issued as U.S. Pat. No. 9,065,614 on Jun. 23, 2015, which is a continuation of U.S. patent application Ser. No. 13/874,278, filed Apr. 30, 2013, which issued as U.S. Pat. No. 8,934,473 on Jan. 13, 2015, which is a continuation of U.S. patent application Ser. No. 13/212,116, filed Aug. 17, 2011, which issued as U.S. Pat. No. 8,432,891 on Apr. 30, 2013, which is a continuation of U.S. patent application Ser. No. 10/583,530, filed May 30, 2007, which issued as U.S. Pat. No. 8,009,660 on Aug. 30, 2011, which is a U.S. National Stage of PCT Application No. PCT/US05/01939, filed Jan. 20, 2005, which claims the benefit of and priority to U.S. Provisional Patent Application No. 60/540,032, filed on Jan. 29, 2004, the entire contents of all of which are hereby incorporated by reference herein.

BACKGROUND

In multi-carrier wireless communications, many important system functions such as frequency synchronization and channel estimation, depicted in FIG. 1, are facilitated by using the network information provided by a portion of total subcarriers such as pilot subcarriers. The fidelity level of the received subcarriers dictates how well these functions can be achieved, which in turn affect the efficiency and capacity of the entire network.

In a wireless network, there are a number of base stations, each of which provides coverage to designated areas, normally called a cell. If a cell is divided into sectors, from a system engineering point of view each sector can be considered a cell. In this context, the terms "cell" and "sector" are interchangeable. The network information can be categorized into two types: the cell-specific information that is unique to a particular cell, and the common information that is common to the entire network or to a portion of the entire networks such as a group of cells.

In a multi-cell environment, for example, the base station transmitter of each cell transmits its own pilot subcarriers, in addition to data carriers, to be used by the receivers within the cell. In such an environment, carrying out the pilot-dependent functions becomes a challenging task in that, in addition to the degradation due to multipath propagation channels, signals originated from the base stations at different cells interfere with each other.

One approach to deal with the interference problem has been to have each cell transmit a particular pattern of pilot subcarriers based on a certain type of cell-dependent random process. This approach, to a certain degree, has mitigated the impact of the mutual interference between the pilot subcarriers from adjacent cells; however, it has not provided for a careful and systematic consideration of the unique requirements of the pilot subcarriers.

DETAILED DESCRIPTION

In the following description the invention is explained with respect to some of its various embodiments, providing specific details for a thorough understanding and enablement. However, one skilled in the art will understand that the invention may be practiced without such details. In other instances, well-known structures and functions have not been shown or described in detail to avoid obscuring the depiction of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
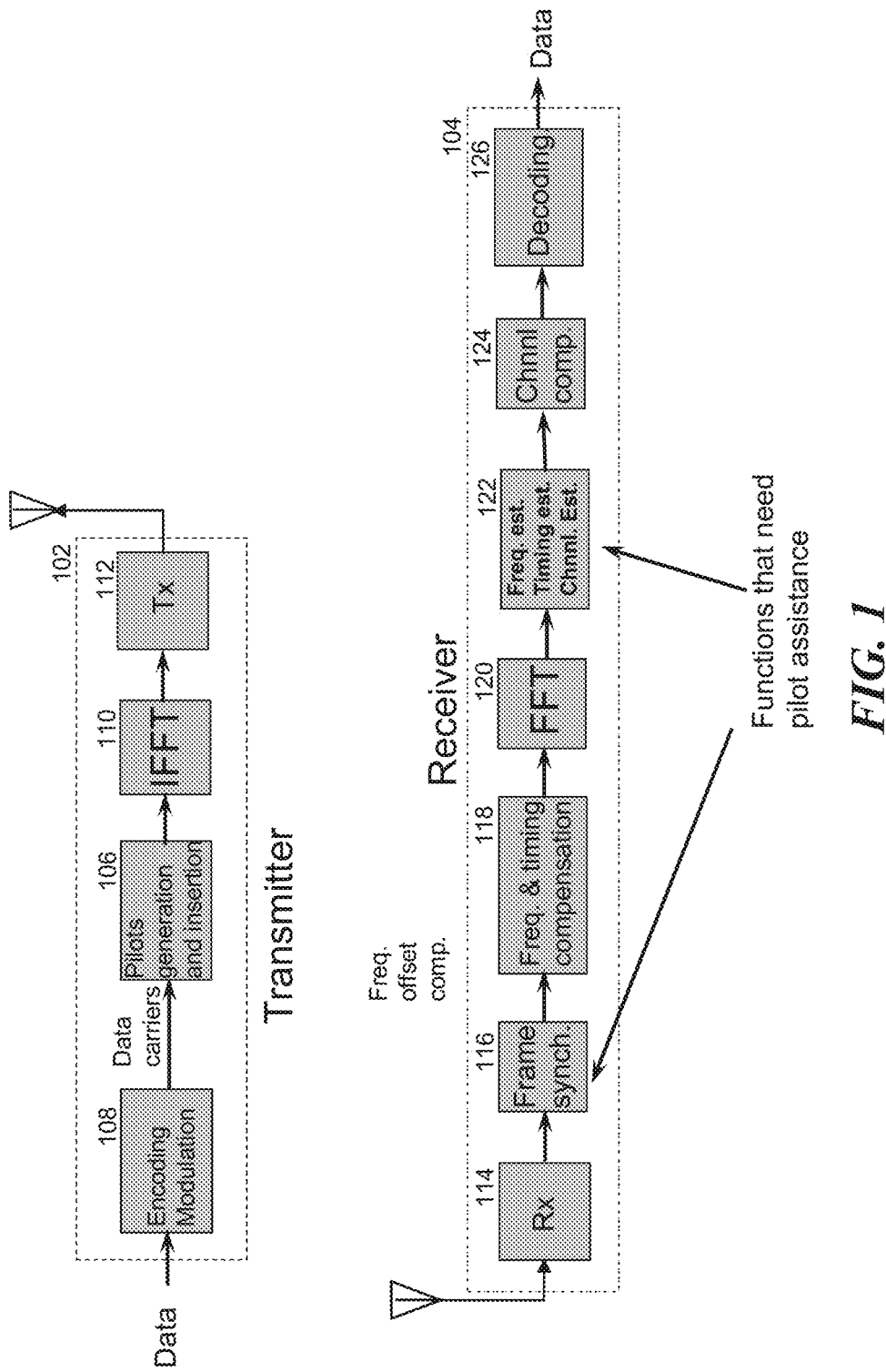
FIG. 1 depicts a basic multi-carrier wireless communication system consisting of a transmitter and a receiver.

FIG. 1 depicts a basic multi-carrier wireless communication system consisting of a transmitter 102 and a receiver 104. A functional block 106 at the transmitter, called Pilot generation and insertion, generates pilot subcarriers and inserts them into predetermined frequency locations. These pilot subcarriers are used by the receiver to carry out certain functions. In aspects of this invention, pilot subcarriers are divided into two different groups according to their functionalities, and hence their distinct requirements. The transmission format of each group of pilot subcarriers will be designed so that it optimizes the performance of the system functions such as frequency synchronization and channel estimation.

The first group is called "cell-specific pilot subcarriers," and will be used by the receiver 104 to extract information unique to each individual cell. For example, these cell-specific pilot subcarriers can be used in channel estimation where it is necessary for a particular receiver to be able to differentiate the pilot subcarriers that are intended for its use from those of other cells. For these pilot subcarriers, counter-interference methods are necessary.

The second group is termed "common pilot sub-carriers," and are designed to possess a set of characteristics common to all base stations of the system. Thus, every receiver 104 within the system is able to exploit these common pilot subcarriers to perform necessary functions without interference problem. For instance, these common pilot subcarriers can be used in the frequency synchronization process, where it is not necessary to discriminate pilot subcarriers of different cells, but it is desirable for the receiver to combine coherently the energy of common pilot subcarriers with the same carrier index from different cells, so as to achieve relatively accurate frequency estimation.

Aspects of this invention provide methods to define the transmission formats of the cell-specific and common pilot subcarriers that enable a receiver to perform different system functions. In particular, a set of design criteria are provided for pilot subcarriers. Other features of this invention further provide apparatus or means to implement the above design processes and methods. In particular, signal reception can be improved by manipulating phase values of the pilot subcarriers and by using power control.

The methods and processes can also be extended to other cases, such as where multiple antennas are used within an individual sector and where some subcarriers are used to carry common network/system information. Base stations can be synchronized in frequency and time by sharing a common frequency oscillator or a common frequency reference signal, such as the one generated from the signals provided by the Global Positioning System (GPS).

Multi-Carrier Communication System

In a multi-carrier communication system such as multi-carrier code division multiple access (MC-CDMA) and orthogonal frequency division multiple access (OFDMA), information data are multiplexed on subcarriers that are mutually orthogonal in the frequency domain. In effect, a frequency selective channel is broken into a number of parallel but small segments in frequency that can be treated as flat fading channels and hence can be easily dealt with using simple one-tap equalizers. The modulation/demodulation can be performed using the fast Fourier transform (FFT).

In a multi-carrier communication system the physical media resource (e.g., radio or cable) can be divided in both the frequency and the time domains. This canonical division provides a high flexibility and fine granularity for resource sharing. The basic structure of a multi-carrier signal in the frequency domain is made up of subcarriers, and within a particular spectral band or channel there are a fixed number of subcarriers. There are three types of subcarriers:

1. Data subcarriers, which carry information data;
2. Pilot subcarriers, whose phases and amplitudes are predetermined and made known to all receivers and which are used for assisting system functions such as estimation of system parameters; and
3. Silent subcarriers, which have no energy and are used for guard bands and DC carriers.

Figure 2:
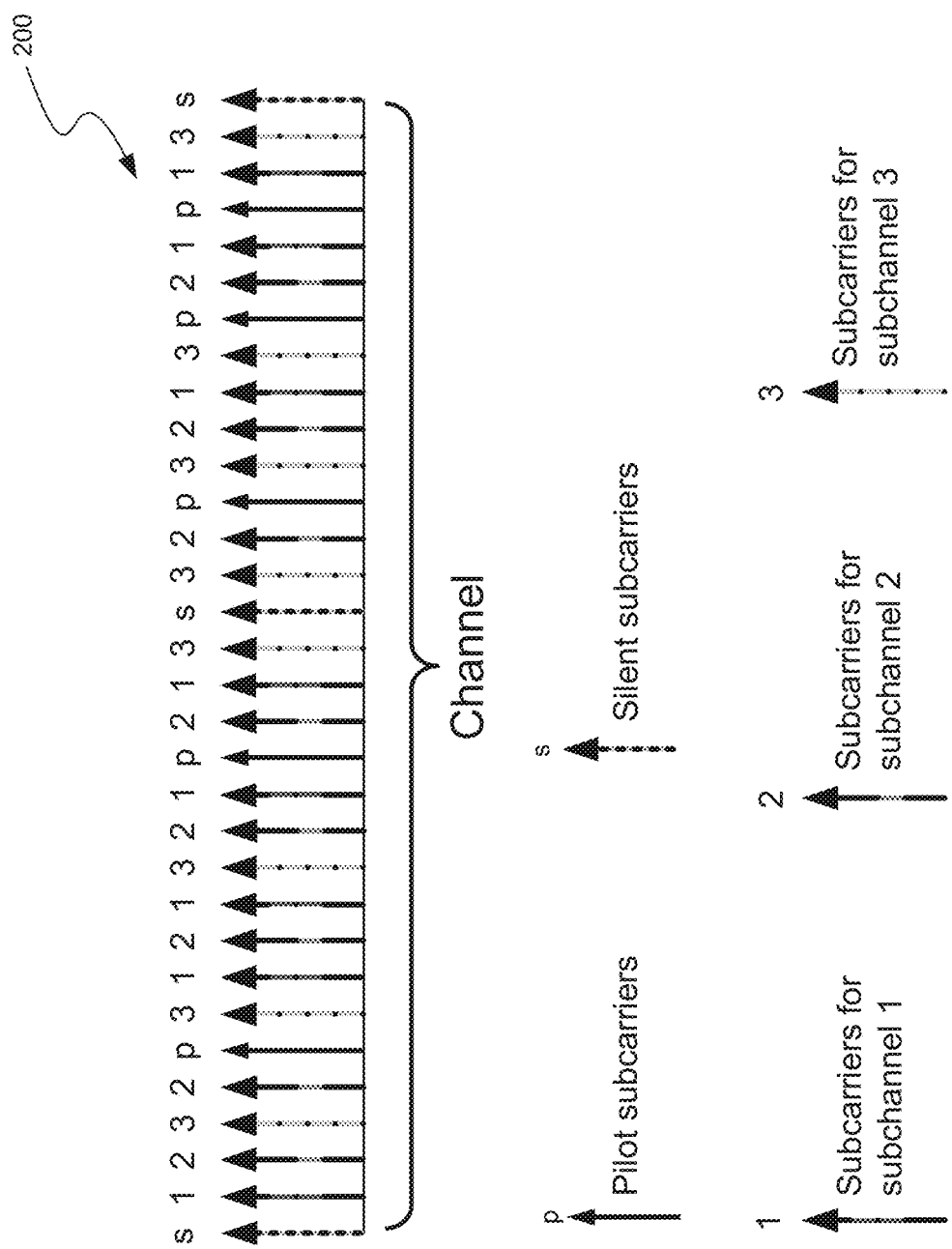
FIG. 2 shows basic structure of a multi-carrier signal in the frequency domain, which is made up of subcarriers.

The data subcarriers can be arranged into groups called subchannels to support multiple access and scalability. The subcarriers forming one subchannel are not necessarily adjacent to each other. This concept is illustrated in FIG. 2, showing a basic structure of a multi-carrier signal 200 in the frequency domain, which is made up of subcarriers. Data subcarriers can be grouped into subchannels in a particular way. The pilot subcarriers are also distributed over the entire channel in a particular way.

Figure 3:
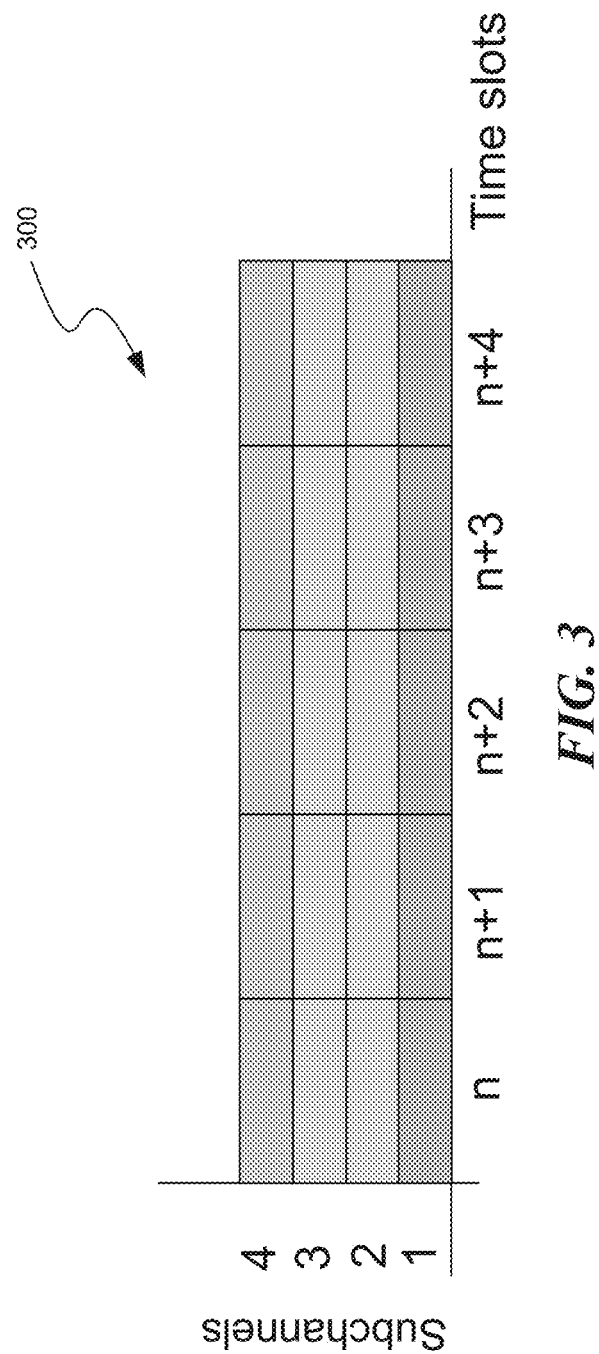
FIG. 3 shows a radio resource divided into small units in both the frequency and time domains: subchannels and time slots.

The basic structure of a multi-carrier signal in the time domain is made up of time slots to support multiple-access. The resource division in both the frequency and time domains is depicted in FIG. 3 which shows a radio resource divided into small units in both the frequency and time domains: subchannels and time slots, 300. The basic structure of a multi-carrier signal in the time domain is made up of time slots.

As depicted in FIG. 1, in a multi-carrier communication system, a generic transmitter may consist of the following functional blocks:

1. Encoding and modulation 108
2. Pilot generation and insertion 106
3. Inverse fast Fourier transform (IFFT) 110
4. Transmission 112

And a generic receiver may consist of the following functional blocks:

1. Reception 114
2. Frame synchronization 116
3. Frequency and timing compensation 118
4. Fast Fourier transform (FFT) 120
5. Frequency, timing, and channel estimation 122
6. Channel compensation 124
7. Decoding 126

Cellular Wireless Networks

Figure 4:
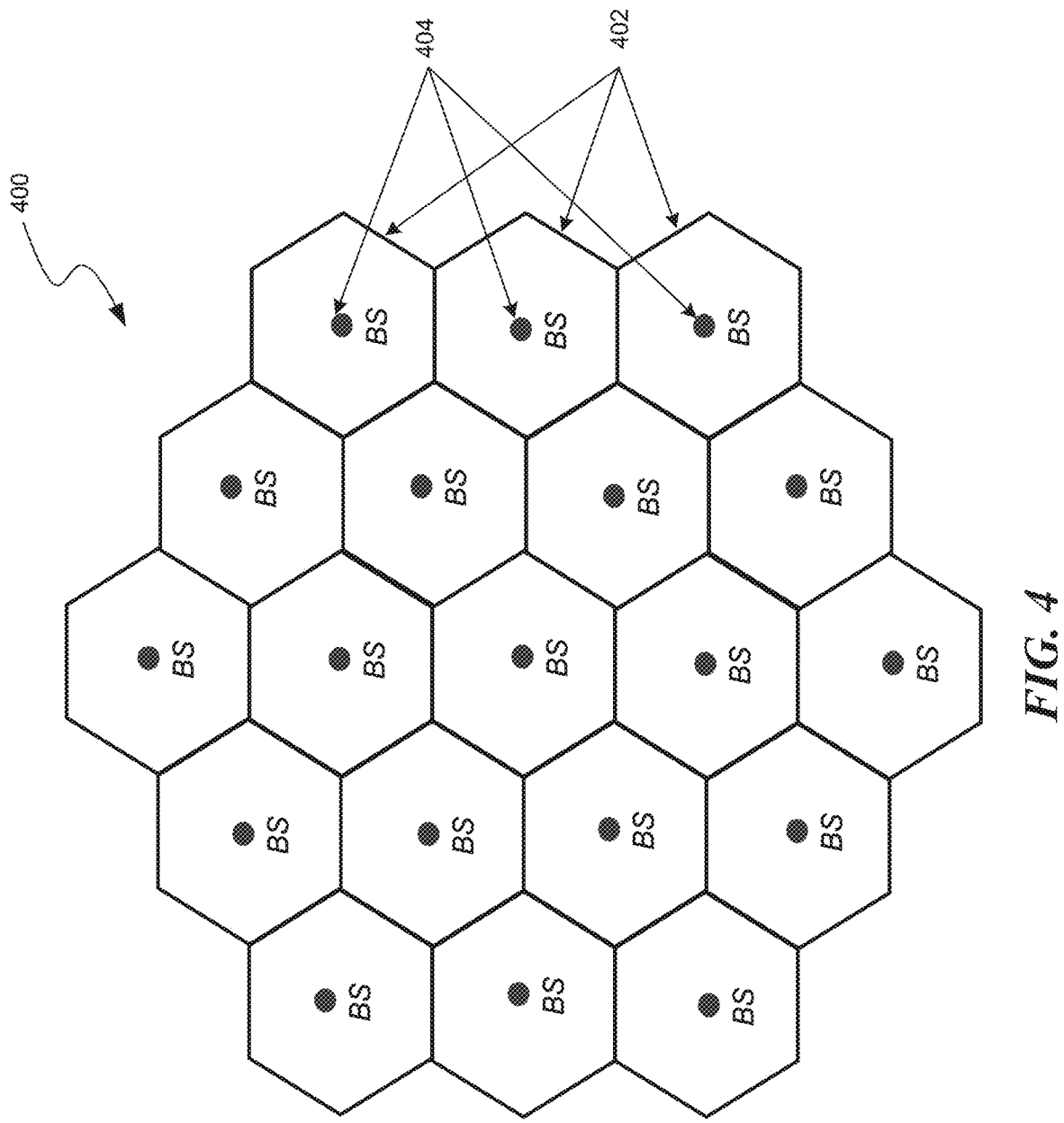
FIG. 4 depicts a cellular wireless network comprised of multiple cells, in each of which coverage is provided by a base station (BS).

In a cellular wireless network, the geographical region to be serviced by the network is normally divided into smaller areas called cells. In each cell the coverage is provided by a base station. Thus, this type of structure is normally referred to as the cellular structure depicted in FIG. 4, which illustrates a cellular wireless network 400 comprised of multiple cells 402, in each of which coverage is provided by a base station (BS) 404. Mobile stations are distributed within each coverage area.

A base station 404 is connected to the backbone of the network via a dedicated link and also provides radio links to mobile stations within its coverage. A base station 404 also serves as a focal point to distribute information to and collect information from its mobile stations by radio signals. The mobile stations within each coverage area are used as the interface between the users and the network.

In an M-cell wireless network arrangement, with one-way or two-way communication and time division or frequency division duplexing, the transmitters at all the cells are synchronized via a particular means and are transmitting simultaneously. In a specific cell 402 of this arrangement, the pth cell, a receiver receives a signal at a specific subcarrier, the ith subcarrier, at the time $t_k$, which can be described as:

$$s_i(t_k) = a_{i,p}(t_k)e^{j\varphi_{i,p}(t_k)} + \sum_{\substack{m=1 \\ m \ne p}}^{M} a_{i,m}(t_k)e^{j\varphi_{i,m}(t_k)} \quad (1)$$

where $\alpha_{i,m}(t_k)$ and $\varphi_{i,m}(t_k)$ denote the signal amplitude and phase, respectively, associated with the $i^{th}$ subcarrier from the base station of the $m_{th}$ cell.

Cell-Specific Pilot Subcarriers

If the ith subcarrier is used as a pilot subcarrier at the pth cell for the cell-specific purposes, the cell-specific information carried by $\alpha_{i,p}(t_k)$ and $\varphi_{i,p}(t_k)$ will be of interest to the receiver at the pth cell and other signals described by the second term on the right hand side of equation (1) will be interference, which is an incoherent sum of signals from other cells. In this case, a sufficient level of the carrier-to-interference ratio (CIR) is required to obtain the estimates of $\alpha_{i,p}(t_k)$ and $\varphi_{i,p}(t_k)$ with desirable accuracy.

There are many ways to boost the CIR. For examples, the amplitude of a pilot subcarrier can be set larger than that of a data subcarrier; power control can be applied to the pilot subcarriers; and cells adjacent to the pth cell may avoid using the ith subcarrier as pilot subcarrier. All these can be achieved with coordination between the cells based on certain processes, described below.

Common Pilot Subcarriers

Figure 5:
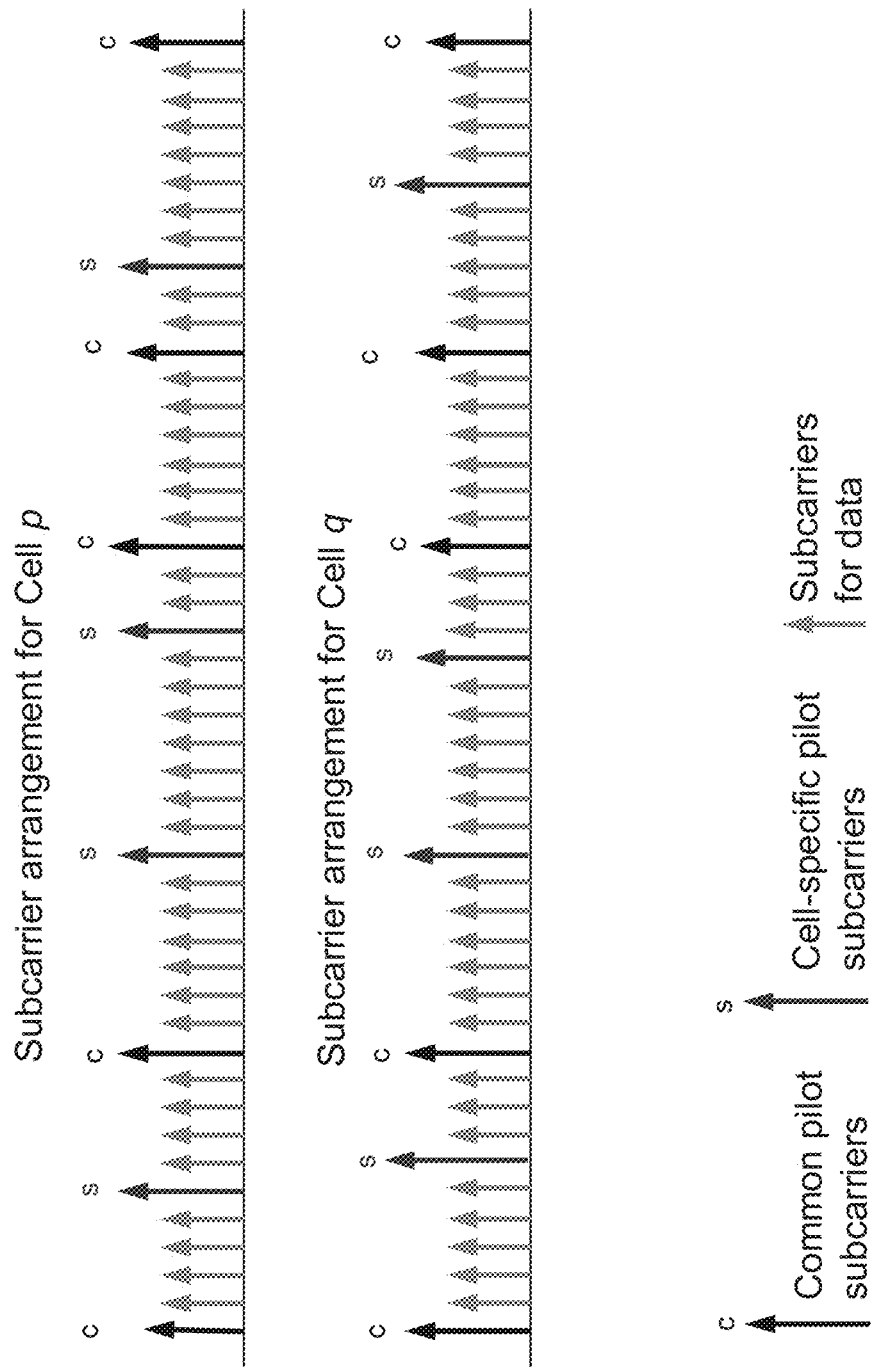
FIG. 5 shows pilot subcarriers divided into two groups: cell-specific pilot subcarriers and common pilot subcarriers.

The common pilot subcarriers for different cells are normally aligned in the frequency index at the time of transmission, as depicted in FIG. 5, which shows pilot subcarriers divided into two groups: cell-specific pilot subcarriers and common pilot subcarriers. The cell-specific pilot subcarriers for different cells are not necessarily aligned in frequency. They can be used by the receiver to extract cell-specific information. The common pilot subcarriers for different cells may be aligned in frequency, and possess a set of attributes common to all base stations within the network. Thus, every receiver within the system is able to exploit these common pilot subcarriers without interference problem. The power of the pilot subcarriers can be varied through a particular power control scheme and based on a specific application.

If the ith subcarrier is used as a pilot subcarrier at the pth cell for the common purposes, it is not necessary to consider the second term on the right hand side of equation (1) to be interference. Instead, this term can be turned into a coherent component of the desirable signal by designing the common pilot carriers to meet the criteria specified in the aspects of this invention, provided that base stations at all cells are synchronized in frequency and time. In such a case the cell in which the receiver is located becomes irrelevant and, consequently, the received signal can be rewritten as:

$$s_i(t_k) = \sum_{m=1}^{M} a_{i,m}(t_k)e^{j\varphi_{i,m}(t_k)} \quad (2)$$

The common pilot subcarriers can be used for a number of functionalities, such as frequency offset estimation and timing estimation.

To estimate the frequency, normally signals at different times are utilized. In an example with two common pilot subcarriers of the same frequency index, the received signal at time $t_{k+1}$, with respect to the received signal at time $t_k$, is given by $$s_i(t_{k+1}) = e^{j2\pi f_i \Delta t}\sum_{m=1}^{M} a_{i,m}(t_{k+1})e^{j\varphi_{i,m}(t_{k+1})} \quad (3)$$

where $\Delta t = t_{k+1} - t_k$. If $\Delta t$ is much less than the coherence period of the channel and $$\alpha_{i,m}(t_k) = c_i \alpha_{i,m}(t_{k+1}) \quad (4)$$

and $$\phi_{i,m}(t_k) = \phi_{i,m}(t_{k+1}) + \beta_i \quad (5)$$

then the frequency can be determined by $$2\pi f_i \Delta t = \arg\{s_i(k)s_i(k+1)\} - \beta_i \quad (6)$$

where $c_i > 0$ and $-\pi \le \beta_i \le \pi$ or are predetermined constants for all values of m. And from all the frequency estimates $\{f_i\}$, a frequency offset can be derived based on a certain criterion.

For timing estimation, normally multiple common pilot carriers are required. In an example of two common pilot subcarriers, the received signal at $f_n$, is given by $$s_n(t_k) = e^{j2\pi \Delta f T_s(t_k)}\sum_{m=1}^{M} a_{n,m}(t_k)e^{j\varphi_{n,m}(t_k)} \quad (7)$$

where $\Delta f = f_n - f_i$ and $T_s$ denotes the sampling period. If $\Delta f$ is much less than the coherence bandwidth of the channel and $$\alpha_{i,m}(t_k) = c(t_k)\alpha_{n,m}(t_k) \quad (8)$$

and $$\phi_{i,m}(t_k) = \phi_{n,m}(t_k) + \gamma(t_k) \quad (9)$$

then $T_s$ can be determined by $$2\pi \Delta f T_s(t_k) = \arg\{s_i^*(t_k)s_n(t_k)\} - \gamma(t_k) \quad (10)$$

where $c(t_k) > 0$ and $-\pi \le \gamma(t_k) \le \pi$ are predetermined constants for all values of m.

Figure 6:
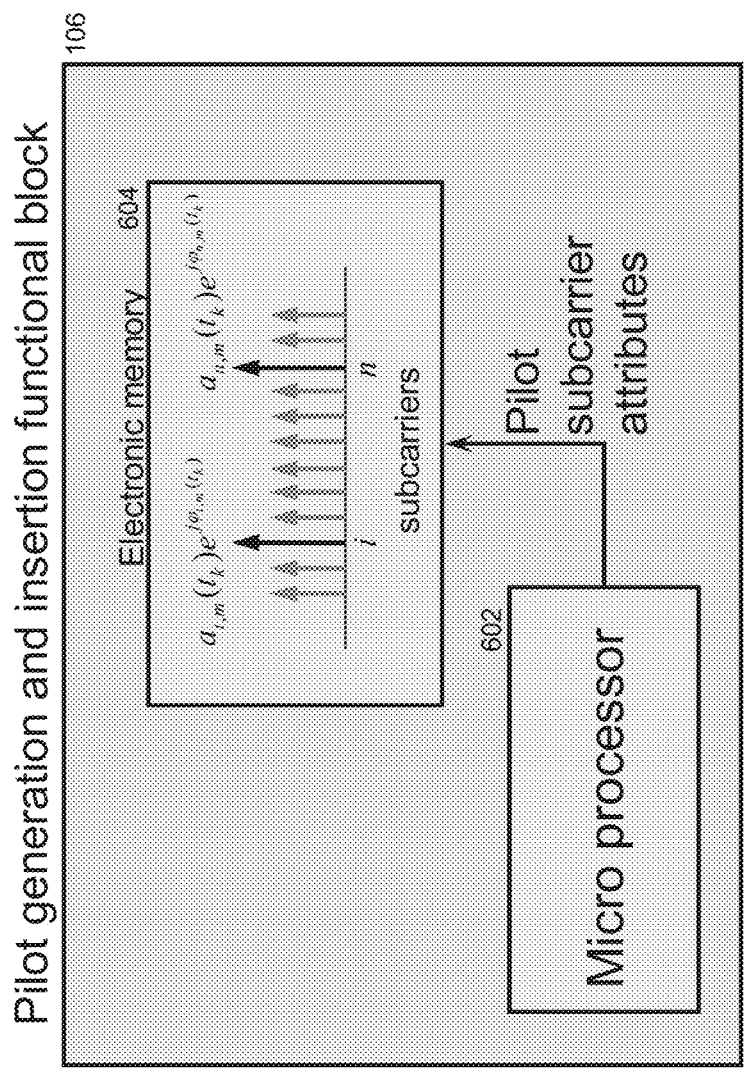
FIG. 6 is an embodiment of pilot-generation-and-insertion functional block shown in FIG. 1, which employs a microprocessor to generate pilot subcarriers and insert them into a frequency sequence contained in the electronic memory.

FIG. 6 is an embodiment of pilot-generation-and-insertion functional block 106 shown in FIG. 1, which employs a microprocessor 602 to generate pilot subcarriers and insert them into a frequency sequence contained in electronic memory 604. In one embodiment of the invention illustrated in FIG. 6, a microprocessor 602 embedded in the pilot-generation-and-insertion functional block 106 computes the attributes of the pilot subcarriers such as their frequency indices and complex values specified by their requirements, and insert them into the frequency sequence contained in the electronic memory 604, such as a RAM, ready for the application of IFFT.

Diversity for Common Pilot Subcarriers

Considering equation (2), which is the sum of a number of complex signals, it is possible for these signals to be destructively superimposed on each other and cause the amplitude of the receiver signal at this particular subcarrier to be so small that the signal itself becomes unreliable. Phase diversity can help this adverse effect. In the example of frequency estimation, a random phase $\vartheta_{l,m}$ can be added to another pilot subcarrier, say the Ith subcarrier, which results in $$\phi_{l,m}(t_k) = \phi_{i,m}(t_k) + \vartheta_{l,m} \quad (11)$$

and $$\phi_{l,m}(t_{k+1}) = \phi_{i,m}(t_{k+1}) + \vartheta_{l,m} \quad (12)$$

where $\vartheta_{l,m}$ should be set differently for each cell, and provided that the following condition is met, $$\phi_{l,m}(t_k) = \phi_{l,m}(t_{k+1}) + \beta_l, \text{ for all values of } m \quad (13)$$

Figure 7:
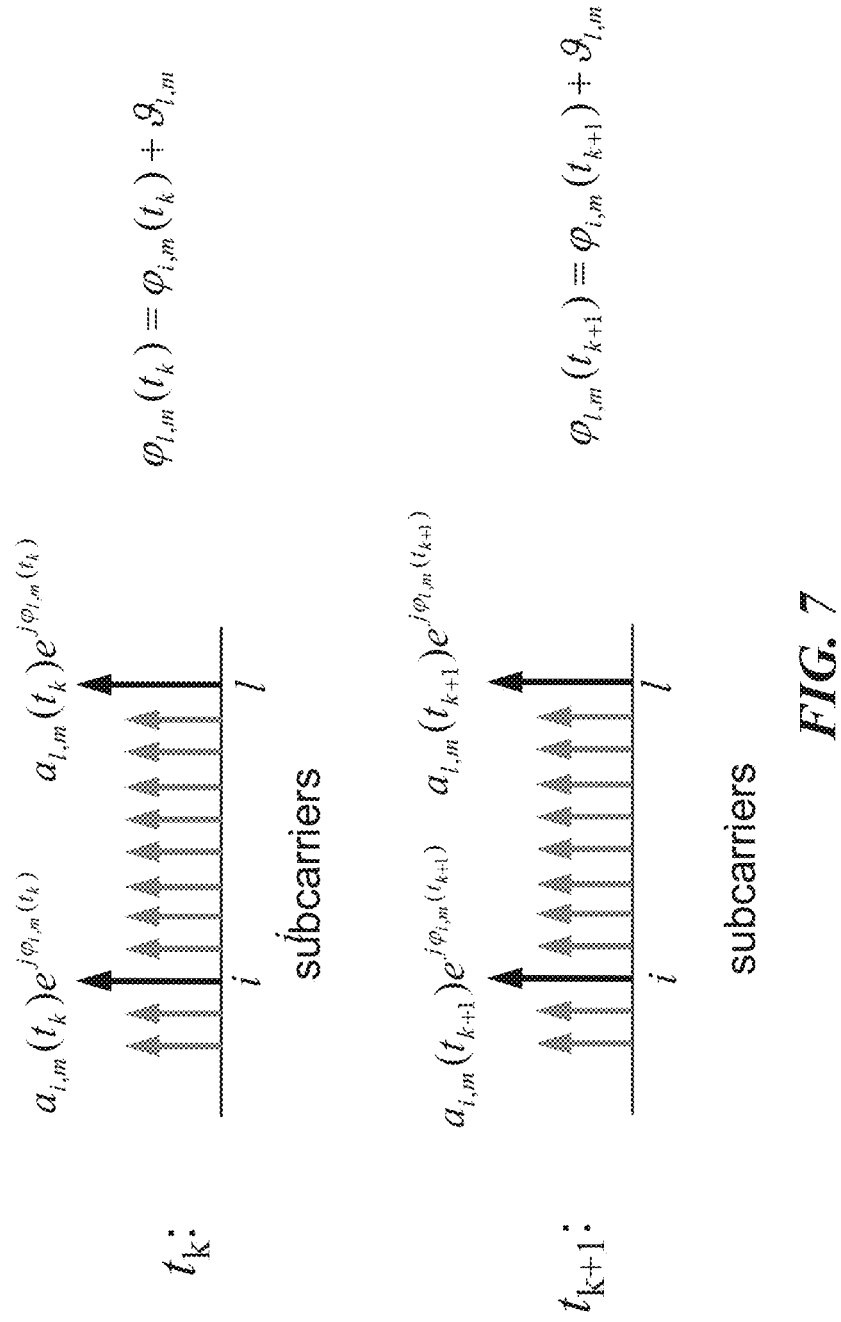
FIG. 7 shows that common pilot subcarriers are generated by a microprocessor of FIG. 6 to realize phase diversity.

With the phase diversity, it is expected that the probability of both $|s_i(t_k)|$ and $|s_i(t_k)|$ diminishing at the same time is relatively small. The embodiment of phase diversity is depicted in FIG. 7, which shows common pilot subcarriers generated by a microprocessor of FIG. 6 to realize phase diversity. It should be noted that time delay will achieve the equivalent diversity effect.

Figure 8:
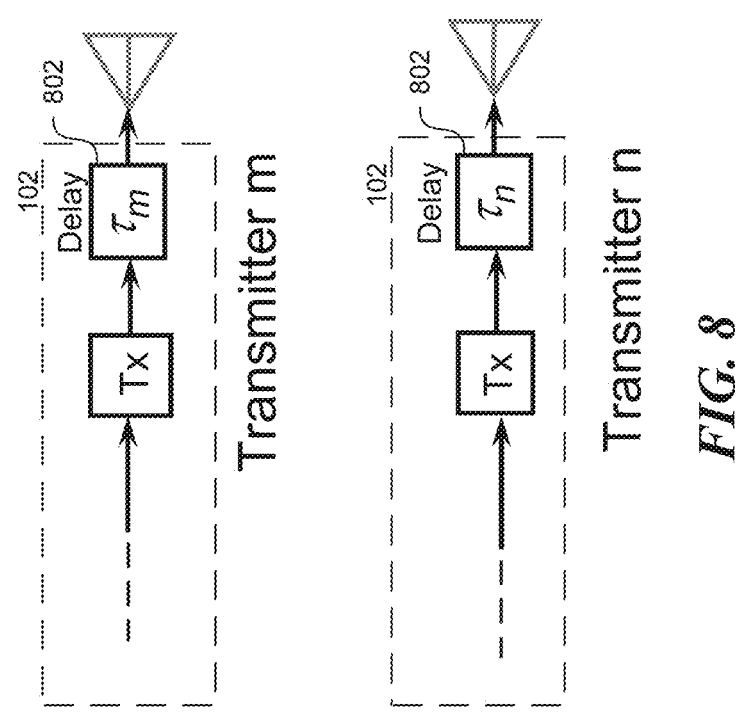
FIG. 8 is an embodiment of delay diversity, which effectively creates phase diversity by adding a random delay time duration, either in baseband or RF, to the time-domain signals.

Another embodiment is illustrated in FIG. 8, which effectively creates phase diversity by adding a random delay time duration 802, either in baseband or RF, to the time-domain signals.

Power Control for Pilot Subcarriers

In one embodiment of the invention, power control can be applied to the pilot subcarriers. The power of the pilot subcarriers can be adjusted individually or as a subgroup to
1. meet the needs of their functionalities;
2. adapt to the operation environments (e.g., propagation channels); and
3. reduce interference between cells or groups of cells.

In another embodiment power control is implemented differently for cell-specific pilot subcarriers and common pilot subcarriers. For example, stronger power is applied to common pilot subcarriers than to the cell-specific subcarriers.

Application to Multiple Antennas

The methods and processes provided by this invention can also be implemented in applications where multiple antennas are used within an individual sector, provided that the criteria specified either by equations (4) and (5) for frequency estimation or by equations (8) and (9) for timing estimation are satisfied.

Figure 9:
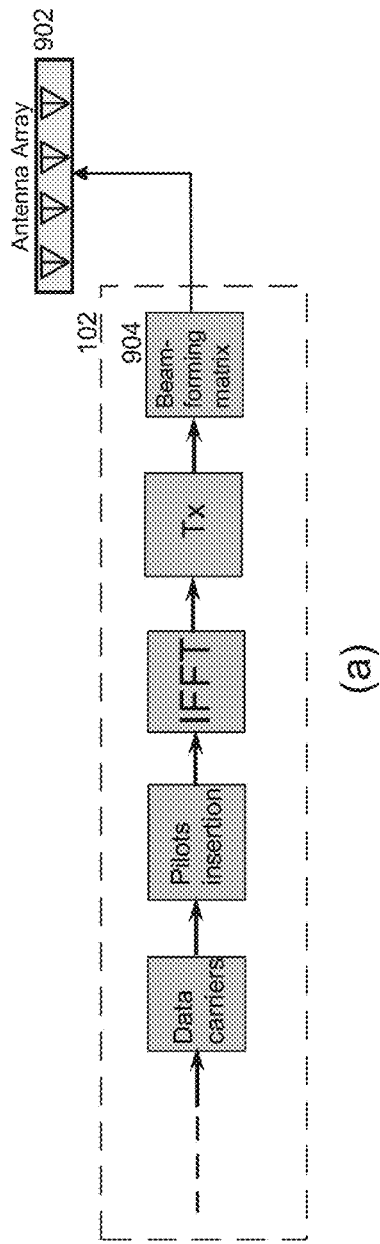
FIG. 9 shows two examples for extension to multiple antenna applications.
Figure 9:
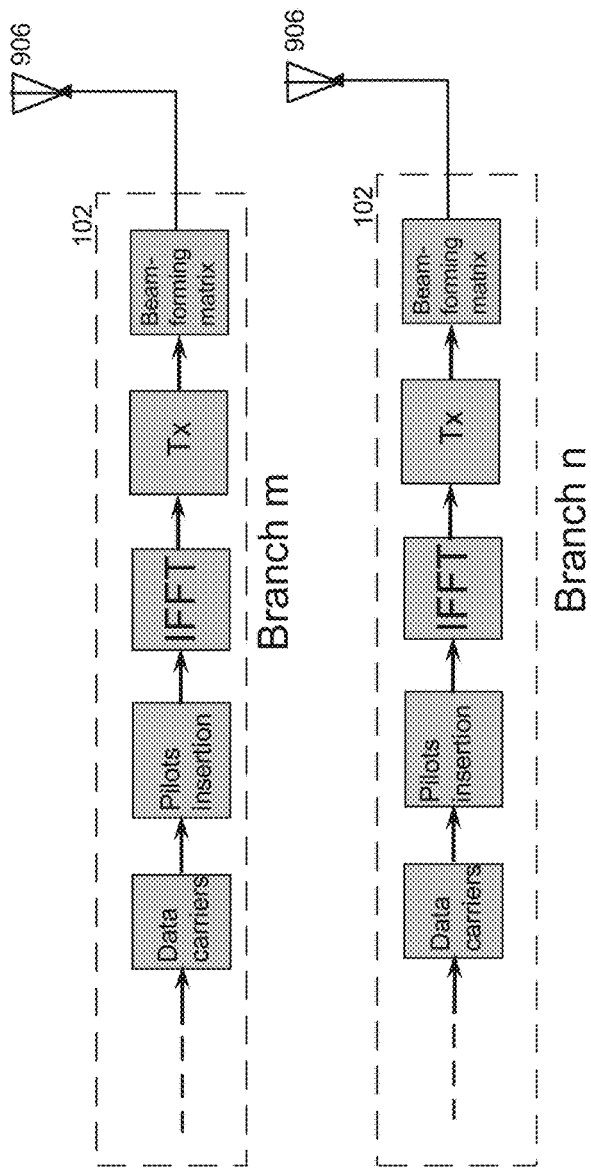

FIG. 9 shows two examples for extension to multiple antenna applications. In case (a) where there is only one transmission branch that is connected to an array of antennas 902 through a transformer 904 (e.g., a beam-forming matrix), the implementation is exactly the same as in the case of single antenna. In case (b) of multiple transmission branches connected to different antennas 906 (e.g., in a transmission diversity scheme or a multiple-input multiple-output scheme), the cell-specific pilot subcarriers for transmission branches are usually defined by a multiple-antenna scheme whereas the common pilot subcarriers for each transmission branch are generated to meet the requirements of (4) and (5) for frequency estimation or (8) and (9) for timing estimation.

Joint-Use of Cell-Specific and Common Pilot Subcarriers

In one embodiment the cell-specific and common pilot subcarriers can be used jointly in the same process based on certain information theoretic criteria, such as the optimization of the signal-to-noise ratio. For example, in the estimation of a system parameter (e.g. frequency), some or all cell-specific subcarriers, if they satisfy a certain criterion, such as to exceed a CIR threshold, may be selected to be used together with the common pilot subcarriers to improve estimation accuracy. Furthermore, the common pilot subcarriers can be used along with the cell-specific subcarriers to determine the cell-specific information in some scenarios, one of which is the operation at the edge of the network.

Base Transmitters Synchronization

Base stations at all cells are required to be synchronized in frequency and time. In one embodiment of the invention the collocated base station transmitters are locked to a single frequency oscillator, as in the case where a cell is divided into sectors and the base stations of these sectors are physically placed at the same location.

Figure 10:
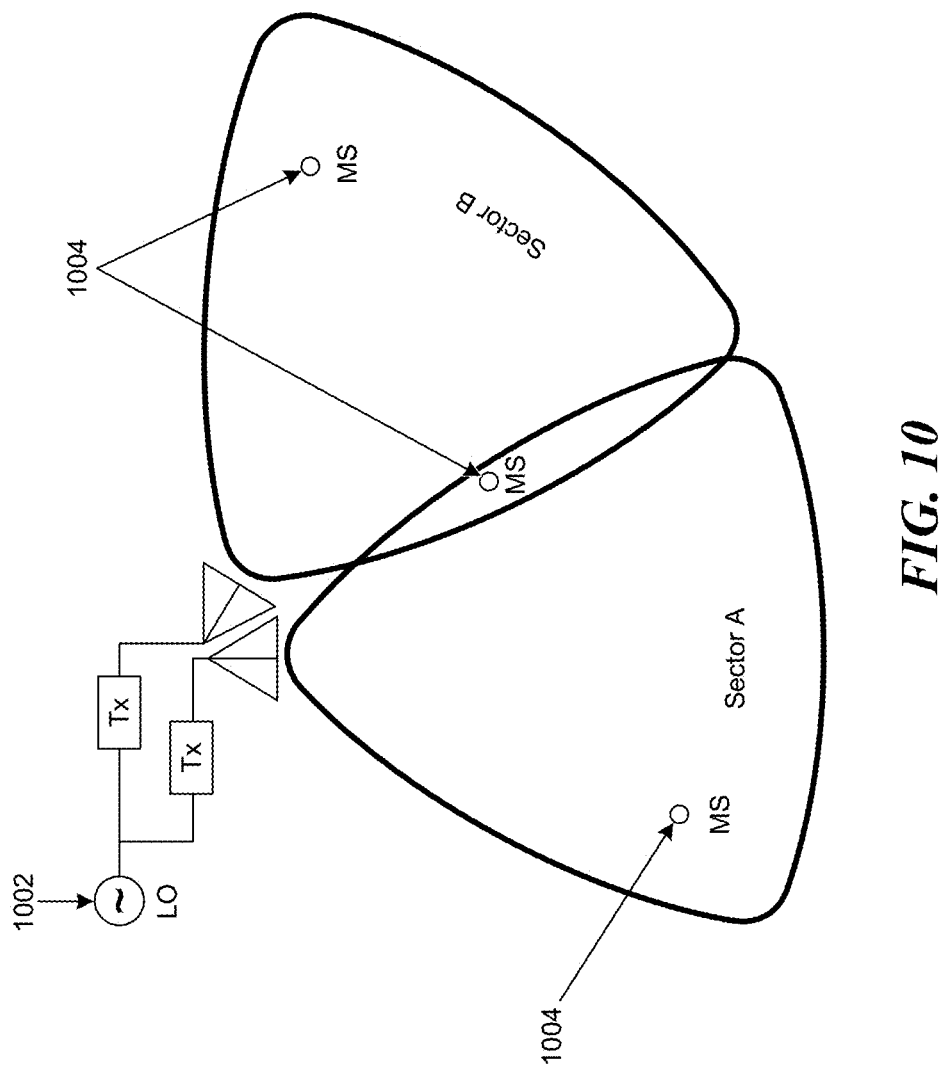
FIG. 10 is an embodiment of synchronization in frequency and time domains of two collocated base stations sharing a common frequency oscillator.
Figure 11:
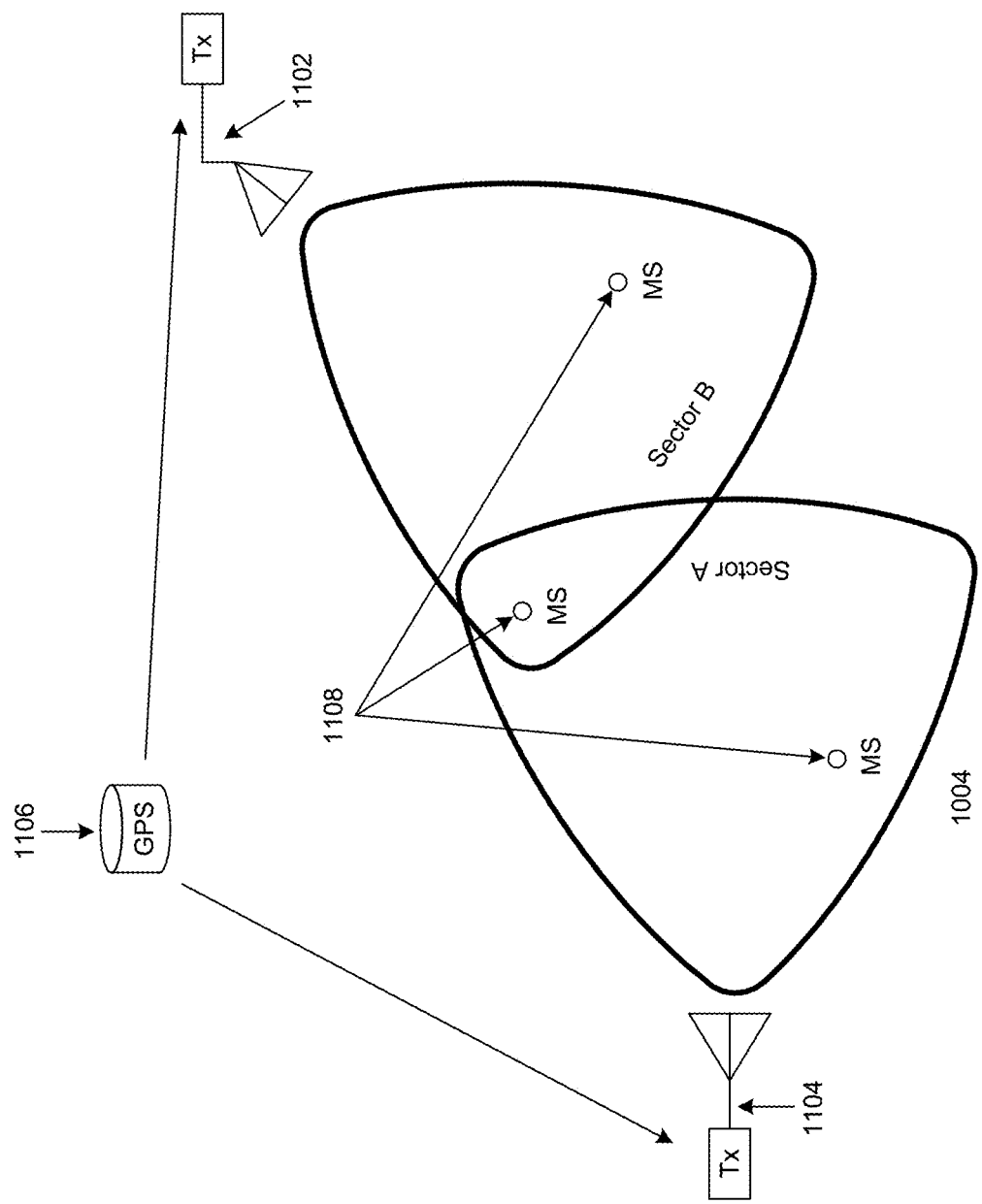
FIG. 11 is an embodiment of synchronization in frequency and time domains with base stations at different locations sharing a common frequency reference signal generated from the GPS signals.

FIG. 10 is an embodiment of synchronization in frequency and time domains of two collocated base stations sharing a common frequency oscillator 1002. Mobile stations 1004 covered by these two base stations do not experience interference when receiving the common pilot subcarriers. The base station transmitters that are located at different areas are locked to a common reference frequency source, such as the GPS signal. FIG. 11 depicts an embodiment of synchronization in frequency and time domains with base stations 1102 and 1104 at different locations sharing a common frequency reference signal generated from the GPS 1106 signals. Mobile stations 1108 covered by these two base stations 1102 and 1104 do not experience interference when receiving the common pilot subcarriers.

In some applications, the entire wireless network may consist of multiple groups of cells (or sectors) and each group may have its own set of common pilot subcarriers. In such scenarios, only those base stations within their group are required to synchronize to a common reference. While the common pilot subcarriers within each group are designed to meet the criteria defined by equations (4) and (5) or by (8) and (9) for the use by its base stations, a particular counter-interference process (e.g., randomization in frequency or power control) will be applied to different sets of common pilot subcarriers. This will cause the signals from the cells within the same group to add coherently while the signals from the cells in other groups are treated as randomized interference.

Figure 12:
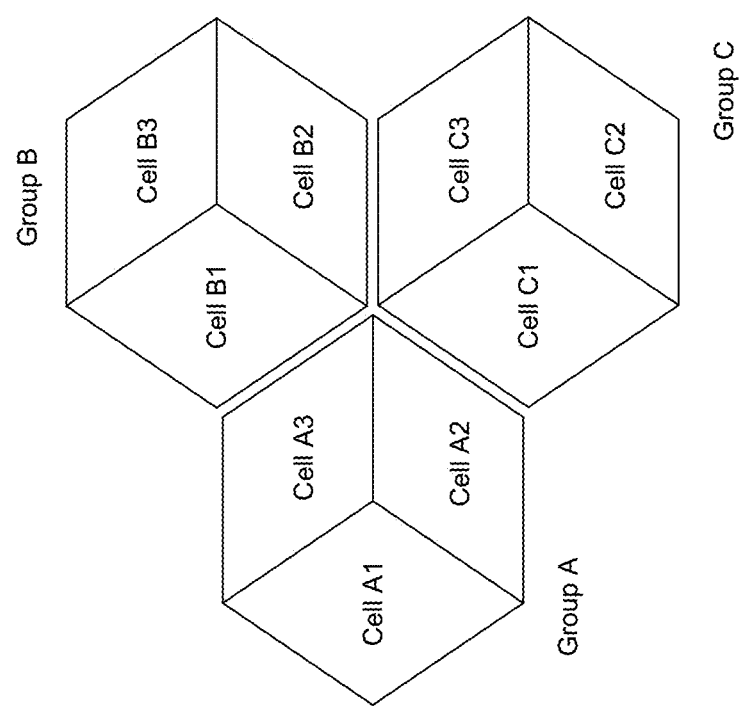
FIG. 12 is an embodiment depicting a wireless network consisting of three groups of cells (or sectors) and base stations in each group that share their own set of common pilot subcarriers.

One embodiment of such implementation is illustrated in FIG. 12, where a wireless network consists of three groups (A, B, and C) of cells (or sectors). The base stations within their own group share the same set of common pilot subcarriers. In this scenario, only those base stations within their group are required to synchronize to a common reference. While the common pilot subcarriers within each group are designed to meet the criteria defined in this invention, a particular counter-interference process (e.g., randomization in frequency) will be applied to different sets of common pilot subcarriers. For example, the base stations at Cells A1, A2, and A3 in Group A synchronize to their own common reference source and transmit the same set of common pilot subcarriers; and the base stations at Cells B1, B2, and B3 in Group B synchronize to their own reference source and transmit another set of common pilot subcarriers that are located at different places in the frequency domain.

Extension to Transmission of Data Information

All design processes, criteria, and methods described in the embodiments of this invention can be extended to applications where common network information is required to be distributed to all receivers within the network. In one example, all the base stations within the network transmit, along with some common pilot subcarriers, an identical set of data subcarriers in which the data information common to all the cells in the network is imbedded.

Figure 13:
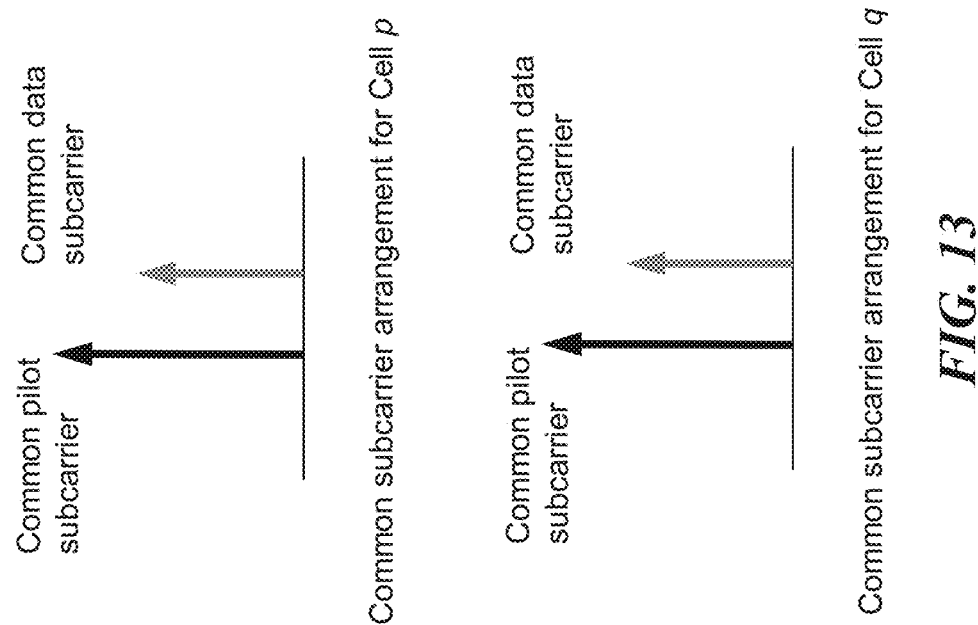
FIG. 13 shows all base stations within a network transmit, along with a common pilot subcarrier, a data subcarrier carrying data information common to all cells in the network.

FIG. 13 shows all base stations within a network transmit, along with a common pilot subcarrier, a data subcarrier carrying data information common to all cells in the network. A receiver within the network can determine the composite channel coefficient based on the common pilot subcarrier and apply it to the data subcarrier to compensate for the channel effect, thereby recovering the data information.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the system described herein. These and other changes can be made to the invention in light of the detailed description.

The elements and acts of the various embodiments described above can be combined to provide further embodiments.

These and other All of the above U.S. patents and applications and other references are incorporated herein by reference. Aspects of the invention can be modified, if necessary, to employ the systems, functions and concepts of the various references described above to provide yet further embodiments of the invention.

Changes can be made to the invention in light of the above detailed description. In general, the terms used in the following claims should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed is:

1. An orthogonal frequency division multiple access (OFDMA)-compatible base station that uses OFDMA subcarriers in a frequency domain and time slots in a time domain, the OFDMA-compatible base station comprising:
   a plurality of antennas; and
   a transmitter operably coupled to the plurality of antennas;
   the transmitter configured to transmit in a cell and at a same time:
      cell-specific pilot OFDMA subcarriers, that carry cell-specific pilots corresponding to the cell, at a transmission power level that is higher than a transmission power level of data OFDMA subcarriers adjacent to each of the cell-specific pilot OFDMA subcarriers, wherein the transmission power level of the cell-specific pilot OFDMA subcarriers is selected based on the transmission power level of the data OFDMA subcarriers, and wherein the cell-specific pilot OFDMA subcarriers is fewer OFDMA subcarriers than all OFDMA subcarriers transmitted in the cell; and
      the data OFDMA subcarriers adjacent to the cell-specific pilot OFDMA subcarriers;
   wherein the cell-specific pilots corresponding to the cell are different than second cell-specific pilots corresponding to a second cell, and further wherein the cell-specific pilot OFDMA subcarriers are different than OFDMA subcarriers via which the second cell-specific pilots are transmitted; and
   wherein data OFDMA subcarriers are transmitted in a neighboring cell corresponding to the same OFDMA subcarriers as the cell-specific OFDMA subcarriers and the cell-specific OFDMA subcarriers are transmitted at a higher power level than the data OFDMA subcarriers transmitted in the neighboring cell.

2. The OFDMA-compatible base station of claim 1, wherein the transmission power level of the cell-specific pilot OFDMA subcarriers is one of a variety of transmission power levels.

3. The OFDMA-compatible base station of claim 1, wherein the transmitter is further configured to beam-form transmissions via the data OFDMA subcarriers.

4. The OFDMA-compatible base station of claim 1, wherein second pilots are transmitted via the data OFDMA subcarriers, and wherein the second pilots are used for a different purpose than the cell-specific pilots.

5. The OFDMA-compatible base station of claim 4, wherein the second pilots are power controlled differently than the cell-specific pilots.

6. The OFDMA-compatible base station of claim 1 wherein each of the cell-specific pilot OFDMA subcarriers is different than each of the data OFDMA subcarriers.

7. A method performed by an orthogonal frequency division multiple access (OFDMA)-compatible base station that uses OFDMA subcarriers in a frequency domain and time slots in a time domain, the method comprising:
   transmitting in a cell and at a same time:
      cell-specific pilot OFDMA subcarriers, that carry cell-specific pilots corresponding to the cell, at a transmission power level that is higher than a transmission power level of data OFDMA subcarriers adjacent to each of the cell-specific pilot OFDMA subcarriers, wherein the transmission power level of the cell-specific pilot OFDMA subcarriers is selected based on the transmission power level of the data OFDMA subcarriers, and wherein the cell-specific pilot OFDMA subcarriers is fewer OFDMA subcarriers than all OFDMA subcarriers transmitted in the cell; and
      the data OFDMA subcarriers adjacent to the cell-specific pilot OFDMA subcarriers;
   wherein the cell-specific pilots corresponding to the cell are different than second cell-specific pilots corresponding to a second cell, and further wherein the cell-specific pilot OFDMA subcarriers are different than OFDMA subcarriers via which the second cell-specific pilots are transmitted; and
   wherein data OFDMA subcarriers are transmitted in a neighboring cell corresponding to the same OFDMA subcarriers as the cell-specific OFDMA subcarriers and the cell-specific OFDMA subcarriers are transmitted at a higher power level than the data OFDMA subcarriers transmitted in the neighboring cell.

8. The method of claim 7 wherein the transmission power level of the cell-specific pilot OFDMA subcarriers is one of a variety of transmission power levels.

9. The method of claim 7, further comprising beam-forming transmissions via the data OFDMA subcarriers.

10. The method of claim 7 wherein second pilots are transmitted via the data OFDMA subcarriers, and wherein the second pilots are used for a different purpose than the cell-specific pilots.

11. The method of claim 10 wherein the second pilots are power controlled differently than the cell-specific pilots.

12. The method of claim 7 wherein each of the cell-specific pilot OFDMA subcarriers is different than each of the data OFDMA subcarriers.

13. An orthogonal frequency division multiple access (OFDMA)-compatible mobile station that uses OFDMA subcarriers in a frequency domain and time slots in a time domain, the OFDMA-compatible mobile station comprising:
- at least one antenna; and
- a receiver; and
- the at least one antenna and the receiver are configured to receive in a cell and at a same time:
  - cell-specific pilot OFDMA subcarriers, that carry cell-specific pilots corresponding to the cell, at a transmission power level that is higher than a transmission power level of data OFDMA subcarriers adjacent to each of the cell-specific pilot OFDMA subcarriers, wherein the transmission power level of the cell-specific pilot OFDMA subcarriers is based on the transmission power level of the data OFDMA subcarriers, and wherein the cell-specific pilot OFDMA subcarriers is fewer OFDMA subcarriers than all OFDMA subcarriers transmitted in the cell; and
  - the data OFDMA subcarriers adjacent to the cell-specific pilot OFDMA subcarriers; and
- the receiver is further configured to:
  - recover cell-specific information using the cell-specific pilots;
- wherein the at least one antenna and the receiver are further configured to receive second cell-specific pilots corresponding to a second cell, wherein the cell-specific pilot OFDMA subcarriers are different than OFDMA subcarriers on which the second cell-specific pilots are received; and
- wherein data OFDMA subcarriers are received from a neighboring cell corresponding to the same OFDMA subcarriers as the cell-specific OFDMA subcarriers and the cell-specific OFDMA subcarriers are received at a higher power level than the data OFDMA subcarriers received from the neighboring cell.

14. The OFDMA-compatible mobile station of claim 13, wherein the transmission power level of the cell-specific pilot OFDMA subcarriers is one of a variety of transmission power levels.

15. The OFDMA-compatible mobile station of claim 13 wherein second pilots are received on the data OFDMA subcarriers, and wherein the second pilots are used for a different purpose than the cell-specific pilots.

16. The OFDMA-compatible mobile station of claim 15 wherein the second pilots are received with a different power level than the cell-specific pilots.

17. The OFDMA-compatible mobile station of claim 13 wherein each of the cell-specific pilot OFDMA subcarriers is different than each of the data OFDMA subcarriers.

18. A method performed by an orthogonal frequency division multiple access (OFDMA)-compatible mobile station that uses OFDMA subcarriers in a frequency domain and time slots in a time domain, the method comprising:
- receiving in a cell and at a same time:
  - cell-specific pilot OFDMA subcarriers, that carry cell-specific pilots corresponding to the cell, at a transmission power level that is higher than a transmission power level of data OFDMA subcarriers adjacent to each of the cell-specific pilot OFDMA subcarriers, wherein the transmission power level of the cell-specific pilot OFDMA subcarriers is based on the transmission power level of the data OFDMA subcarriers, and wherein the cell-specific pilot OFDMA subcarriers is fewer OFDMA subcarriers than all OFDMA subcarriers transmitted in the cell;
  - the data OFDMA subcarriers adjacent to the cell-specific pilot OFDMA subcarriers;
- recovering cell-specific information using the cell-specific pilots; and
- receiving second cell-specific pilots corresponding to a second cell, wherein the cell-specific pilot OFDMA subcarriers are different than OFDMA subcarriers on which the second cell-specific pilots are received;
- wherein data OFDMA subcarriers are received from a neighboring cell corresponding to the same OFDMA subcarriers as the cell-specific OFDMA subcarriers and the cell-specific OFDMA subcarriers are received at a higher power level than the data OFDMA subcarriers received from the neighboring cell.

19. The method of claim 18, wherein the transmission power level of the cell-specific pilot OFDMA subcarriers is one of a variety of transmission power levels.

20. The method of claim 18 wherein second pilots are received on the data OFDMA subcarriers, and wherein the second pilots are used for a different purpose than the cell-specific pilots.

21. The method of claim 20 wherein the second pilots are received with a different power level than the cell-specific pilots.

22. The method of claim 18 wherein each of the cell-specific pilot OFDMA subcarriers is different than each of the data OFDMA subcarriers.

\* \* \* \* \*